June 26, 1945.                M. R. HOLSTE                2,379,153
   APPARATUS FOR EQUALIZING THE LIGHT INTENSITY OF A FIELD
      OF VIEW INCLUDING THE SUN AND ADJACENT SPACE
                    Filed Aug. 20, 1942
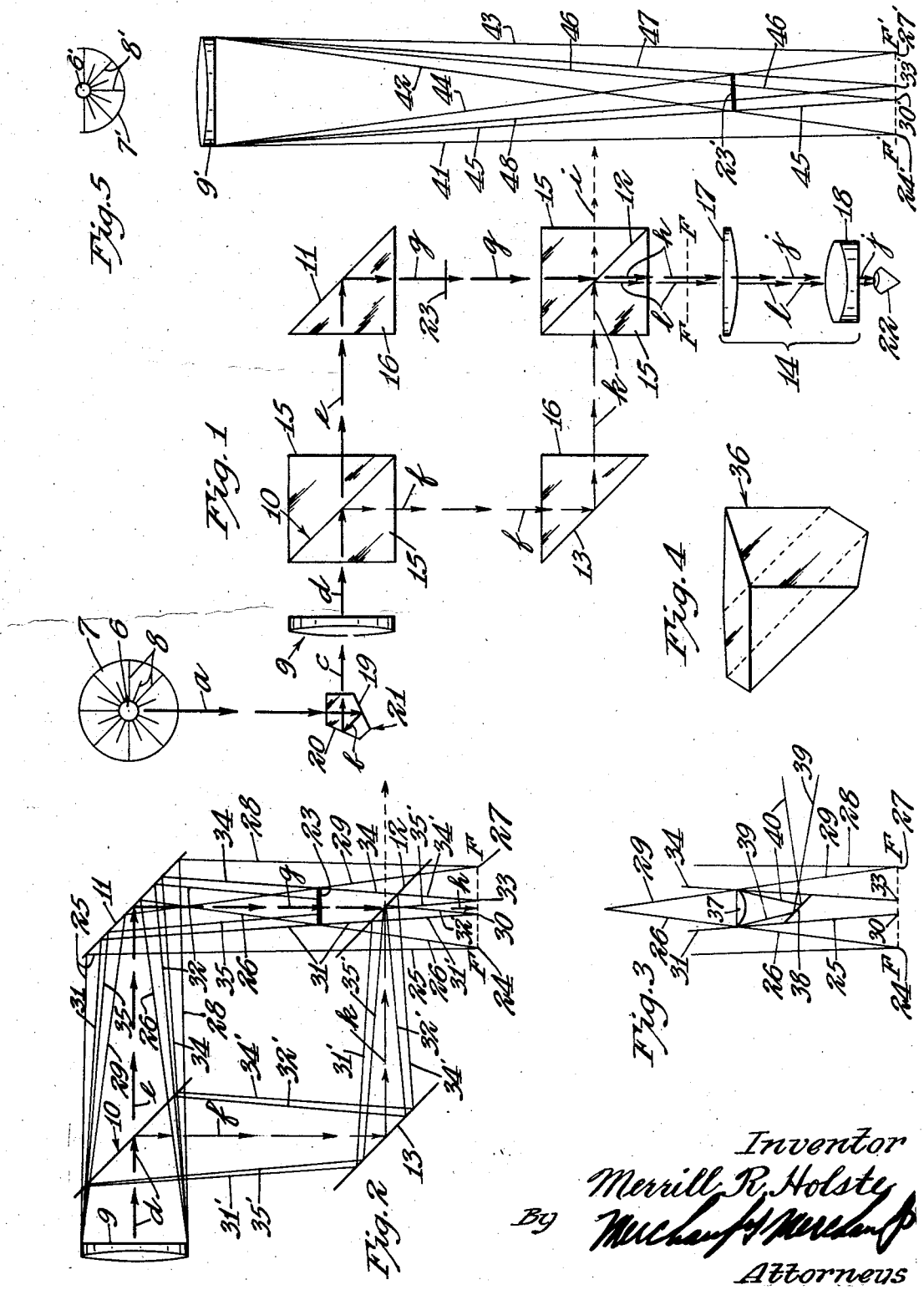
Inventor
Merrill R. Holste
By
Attorneys Patented June 26, 1945

2,379,153

UNITED STATES PATENT OFFICE 2,379,153

APPARATUS FOR EQUALIZING THE LIGHT INTENSITY OF A FIELD OF VIEW INCLUDING THE SUN AND ADJACENT SPACE

Merrill R. Holste, St. Paul, Minn.

Application August 20, 1942, Serial No. 455,478

6 Claims. (Cl. 88—1)

My present invention relates to optical apparatus for use in inspecting a field of view which includes the sun and adjacent space and has as a primary objective the provision of apparatus of the kind described whereby the widely varying light intensity over a field of view, including the sun and adjacent space, will be equalized sufficiently to permit comfortable viewing of the whole without unduly darkening or lowering the light intensity of any area within the field of view.

While numerous uses may be made of the apparatus of this invention, a very acute need therefor is believed to have developed in connection with anti-aircraft gunnery for use in locating and finding the range of enemy aircraft flying in or through the space directly between the sun and the gunnery observer or who is flying through space just outside of but closely adjacent the sun's circle as seen from the gunnery observer's point of view. Both in the present war and the last war, or World War No. 1, it has been common practice for dive bombardiers and fighter aircraft to fly or dive on their objectives from a part of the sky most brilliantly illuminated by the sun and with a view of staying directly between the sun and the objective where it is very difficult to observe them, due to the extreme intensity of the light from this direction.

Of course, common methods of inspecting the sun include the use of light filtering devices such as colored glass, polarizing screens and the like, but these, as hitherto employed, are not well suited for use in connection with anti-aircraft gunnery since they reduce the varying light intensities over the entire field of view to the same extent, thereby rendering some sections of the field of view at a considerable space from the sun too dark for efficient observation when the efficiency of the device employed is such as to enable comfortable observation directly at the sun.

By utilizing my present invention, however, the light intensity of the solar image can be reduced to any predetermined desired extent over its entire diameter and the field of view surrounding the solar face can be reduced to a desired varying extent which reaches its maximum reduction directly adjacent the image of the solar face and decreases radially outwardly therefrom. In other words, by means of the present invention, it is possible to so variably reduce the intensity of the light of a field of view including the sun and adjacent area to such an extent as to render the entire field of view of substantially uniform light intensity.

It is believed, therefore, that the present invention will find wide acceptance in connection with sighting and range finding devices used in connection with anti-aircraft gunnery, since the use thereof would permit the anti-aircraft gunnery observer or range finder to inspect with equal efficiency any portion of the sky whether or not it included within it the sun.

The above and other highly important objects and advantages of the invention will be made apparent from the following specification, claims and appended drawing.

Referring to the drawing:

Fig. 1 is a diagrammatic view illustrating a preferred embodiment of the invention positioned to take in a field of view including the sun;

Fig. 2 is a diagrammatic view illustrating the boundaries and paths of various cones of light projected from the objective lens of the apparatus of Fig. 1 when the said apparatus is pointed as in Fig. 1;

Fig. 3 is a diagrammatic view illustrating a preferred form of solar image intercepting, converging and removing device for use in connection with the forms of the invention shown in Figs. 1 and 2;

Fig. 4 is a perspective view of a roof angled prism which may, if desired, be substituted for certain of the prisms in Figs. 1 and 2 for the purpose of image erection; and Fig. 5 is a diagrammatic view of a modified form of the invention.

In Fig. 1 the sun is indicated by the numeral 6, the entire field of view within the angle of view of the optical apparatus of Fig. 1, and which includes the sun 6, is indicated by a circle 7, and the varying intensity of light from the sun radially outwardly to the edge of the field of view is indicated by radial lines 8. For the purpose of this example the sun has been shown concentric to the axis of the field of view, but it will be understood that the location of the sun within the field of view will vary in practice.

The optical apparatus indicated in Fig. 1 includes an objective lens 9, a partial reflecting surface 10, a total reflecting surface 11, a partial reflecting surface 12, a total reflecting surface 13, and an eye piece 14. The partial reflecting surfaces 10 and 12 may be provided by cementing together the hypotenuse faces of two right angle prisms 15, whereas the total reflecting surfaces 11 and 13 may each be provided by the hypotenuse faces 11 of single right angle prisms 16 and 16. The eye piece 14 may be, and as illustrated, is of the "Kellner" type consisting of a plano-convex field lens 17 and a cemented doublet eye lens 18. As illustrated, the preferred embodiment of the invention illustrated in Fig. 1 also includes a system of reflecting surfaces 19 and 20 for bending the axis of the rays representing the field of view of the apparatus 90° without inverting the resultant image, and, as illustrated, the surfaces 19 and 20 in the smaller telescopes may be provided by means of a constant angle prism 21. It will hereinafter be obvious that this device 21 could be dispensed with if desired. Also indicated in Fig. 1 is an operator's eye 22.

It will be obvious to one skilled in the optical arts that if it should prove desirable with some special instruments to use a lens inverting system in conjunction with the eye piece, that pentagonal prisms, similar to the prisms illustrated by 19, 20 and 21, can be substituted for reflecting surfaces 11 and 13. In other words, my present invention is adapted to employ any system of image erection inserted at any point in the optical system.

When the device of Fig. 1 is pointed, as indicated, the course of travel of light rays from the field of view through the apparatus to the observer's eye 22 will be as follows, to wit: the light waves representing the entire field of view, including the sun 6, will be directed onto the reflector surface 19, as indicated by heavy arrows $a$, from which the said light waves representing the entire field of view will be directed onto the reflecting surface 20, as indicated by heavy arrows $b$, from which they will be reflected onto the objective lens 9, as indicated by heavy arrows $c$. These light rays representing the entire field of view will now be projected from the objective lens 9 to the partial reflecting surface 10, as indicated by heavy arrows $d$. Now this partial reflecting surface 10 has an extremely low efficiency as a reflector and passes directly through it the vast majority of the light rays which may, for the sake of example, be assumed to be 99.9 percent more or less, and reflects the remainder which, in accordance with the present example, would be one-tenth of one percent. Hence, the course of the light waves forming the entire image is split or divided at this point (reflecting surface 10), the main path or course which passes through the reflecting surface 10 being indicated by heavy arrows $e$, and the minor part or percentage of the light rays forming the entire image, and which is reflected from surface 10, being represented by light full line arrows $f$. Now the large percentage of light waves passed through the reflecting surface 10, and as represented by heavy arrows $e$, will be directed onto the reflecting surface 11 by which they will be bent and totally reflected at an angle, as indicated by heavy arrows $g$, and will be directed onto the partial reflecting surface 12. The reflecting surface 12 may be assumed to have substantially the same characteristics as the reflecting surface 10 so that the vast majority of the light striking the reflecting surface 12, in the direction indicated by arrows $g$, will be transmitted directly through the reflecting surface 12, as indicated by heavy arrows $h$, and a very minute part of the light striking the reflecting surface 12 from the direction indicated by arrows $g$ will be bent at an angle and reflected away, as indicated by dotted line arrows $i$, and will represent lost light. However, the light transmitted through the reflecting surface 10 from the direction of arrows $g$ and as represented by heavy line arrows $h$, will be directed onto the lens 17 of the eye piece 14 from which it will be transmitted to the operator's eye through the eye piece lens 18, as indicated by heavy arrows $j$.

Now the very minor portion of light rays representing the field of view of the objective lens, and which were reflected from the partial reflecting surface 10, as indicated by light line arrows $f$, are directed onto the total reflecting surface 13 from which they are totally reflected at an angle, as indicated by light line arrows $k$, onto the partial reflecting surface 12. Now this partial reflecting surface 12 transmits the vast majority of the light energy striking the same in the direction of arrows $k$ and, as indicated by dotted line arrows $i$, reflects the very minor part of this light energy from surface 12, as indicated by light full line arrows $l$. For the sake of the present example, it may, therefore, be assumed that the low intensity light striking the surface 12 in the direction of arrows $k$ will be about 99.9 percent transmitted in the direction of dotted line arrows $i$ and is about 1/10 of one percent reflected in the direction of arrows $l$.

Hence, on the basis of the figures used for the sake of example and disregarding all other losses including losses purposely introduced by the intercepting device hereinafter to be described of the total useful light passing the objective lens 9 approximately nine hundred and ninety-eight one-thousandths thereof would pass on to the focal plane over the main path indicated by arrows $d$, $e$, $g$ and $h$, whereas only approximately one millionth of the total useful light passing the objective lens 9 would be projected on to the focal plane over the auxiliary path indicated by arrows $d$, $f$, $k$ and $l$. It should, of course, be definitely understood that these figures are merely given for the purpose of example and that the actual proportion of light going over the two different paths can be predetermined and then obtained by proper adjusting of the instrument such, for example, as varying the reflecting and transmitting characteristics of the partial reflecting surfaces 10 and 12, or by varying the angle of incidence and consequently of reflection of the auxiliary beam from the said partial reflecting surfaces 10 and 12. It should here be further understood that the apparent discrepancy caused by the fact that .998 and one millionth do not equal 100% results from losses introduced by partial reflecting surface 12. One thousandth of the light represented by heavy line arrow $g$ is reflected out and lost in the direction of dotted line arrow $i$. Then, also, .999 of the light represented by light line arrow $k$ is transmitted through partial reflecting surface 12 in the direction of dotted line arrow $i$.

It should be understood that the axis of the path of low intensity reflected light energy, as indicated by light line arrows $l$ will coincide with the axis of the path of high intensity light energy, indicated by heavy full line arrows $h$, and will produce superimposed images on the focal plane $f$—$f$; attention being directed to the fact that the optical distance between the focal plane $f$—$f$ and objective lens through either the main or auxiliary paths is equal in each instance, the actual distances with respect to the actual focal length of the lens being, of course, varied somewhat by the interposition of an equal proportion of glass in the two paths.

From the above it will be apparent that the partial reflecting surface 10 divides the light energy transmitted or projected from the objective lens 9 into main and auxiliary light beams, the main beam following the path indicated by arrows $e$ and $g$ and the low intensity beam following the path indicated by arrows $f$ and $k$. It will further be apparent that that part of the light energy striking the reflecting surface 12 over path $f$ and $k$, and which is reflected by surface 12, will be directed to $f$—$f$ coaxially with the light energy transmitted through 12 and coming to reflecting surface 12 over path $e$ and $g$.

I wish to explain here that the angles of incidence and reflection of light from the partial and total reflecting surfaces 10, 11, 12, 13, need not necessarily be exactly 45° as is shown in Figs. 1 and 2, but can be made more or less than this illustrated angle. Opposite sides of the rectangle e, f, k, g would still have to be made equal and parallel in order to maintain equal length of light path for main and auxiliary beams. This change in design of the angle of reflection would introduce an additional method of predetermining what proportion of the light would be reflected or transmitted at surfaces 10 and 12.

In the diagram Fig. 1 the spacing of the arrows l and h is merely for the purpose of making it easier to follow the travel of light energy entirely through the device and is not intended to indicate a spaced parallel axis condition of the main and auxiliary light beams which are co-axial as above pointed out.

The co-axial light beams indicated by arrows l and h, form superimposed images at a focal plane f—f and the eye piece consisting of lenses 17 and 18 is positioned to view the common image or superimposed images formed at the focal plane f—f.

To complete the apparatus of the invention shown in Fig. 1 and render it capable of accomplishing the desired end, it is necessary to place in the main light beam path, indicated by arrows e and g, a device for intercepting and removing from the main light beam, at a point before its recombining with the auxiliary light beam, those light waves representing the solar image, and such a device is diagrammatically indicated in Fig. 1 by line 23. For a preliminary understanding of the device the line 23 may be assumed to represent a light absorbing disc or a slightly inclined mirror of a diameter equal to that of the cone of light representing the entire solar image at the point of interception. However, the function and effect of this intercepting device 23 will be elaborated on and clarified in the following description of Fig. 2.

In diagrammatic view Fig. 2 various cones of light projected from the objective lens 9 to or toward the focal plane f—f are indicated for the purpose of explaining the operation of the apparatus of Fig. 1. I wish to say in explanation of the term "cone of light" that any and every point in the image space is formed by an innumerable number of rays or photons of light coming from the whole objective lens and projected thereby onto its one point of image space. All these rays taken together can be considered as filling the space bounded by a cone having its base on the objective lens and its apex at the point on the image space. In a sense Fig. 2 is representative of an axial cross section through the main and auxiliary light beams, lens 9 and focal plane f—f. With particular reference to Fig. 2 a cone of light forming a point 24 in the extreme outer edge of the total image formed on the focal plane f—f is indicated by lines 25 and 26, a cone of light forming a point 27 in the opposite outer edge of the total image formed at the focal plane f—f is indicated by lines 28 and 29, and a cone of light which would, if not interrupted by the device 23, form a point 30 at one edge of the solar image on the focal plane f—f is indicated by lines 31 and 32, and a similar cone of light which would, if not interrupted by the device 23, form a point 33 at the opposite edge of the solar image on the focal plane, is indicated by lines 34 and 35. At this point it should be noted with particular reference to Fig. 2 that the cones of light formed by lines 31 and 32 on one hand and 34 and 35 on the other hand which would, if not interrupted, form points at opposite edges of the solar image position on the focal plane are, in fact, interrupted by the device 23 as is all the solar image forming light energy directed toward the focal plane over the main course or path indicated by arrows e and g. Hence, were it not for the auxiliary light beam coming over the auxiliary path indicated by arrows f and k, a completely black spot would be formed in the focal plane image between points 30 and 33 which would represent points at opposite edges of the solar image position.

Furthermore, it will be seen that because the intercepting device 23 is located in spaced relation to the focal plane f—f, some of the light energy which would form a focal plane image radially outwardly of the periphery of the solar image position on the focal plane will also be intercepted by the device 23 and this will essentially have its greatest light intensity reducing effect immediately adjacent the periphery of the solar image position on the focal plane and will have a decreasing light intensity reducing effect radially outwardly of the solar image position. In fact, in Fig. 2 the intercepting device 23 is so spaced from the focal plane that the light intensity of the focal plane image surrounding the solar image position thereon will be entirely unaffected at the perimeter of the total image and will be increasingly reduced from that point inwards until it is zero intensity at the perimeter of the solar image so as to equalize the varying light intensity of the field image surrounding the solar image.

Of course, the cones of light bounded and indicated by lines 25—26, 28—29, 31—32, and 34—35 will strike the partial reflecting surface 10 and, for the most part, will be transmitted through said reflecting surface 10 over the general path indicated by arrows e and g, but, nevertheless, some of the light energy forming these cones of light striking the reflecting surface 10 will be reflected over the auxiliary path indicated by arrows f and k. Hence, the cones of light defined above will be partially reflected over the path indicated by arrows f and k and will ultimately form, together with innumerable other similar cones of light, an image of the sun on the focal plane f—f which is concentric with the general image formed by the light over the main path. But the intensity of that part of the light transmitted over the auxiliary path, which represents the field outside of the solar image, is so low in intensity as to be of negligible visibility. Therefore, the lines indicating the reflected cones of light passing over the auxiliary path f—k, which represent the field outside of the solar image, have been omitted. However, the cones of light representing the solar image are of sufficient intensity to form a satisfactory visual image at the focal plane, and hence, the partial reflections of lines 31—32 and 34—35, representing the cones of light having their apexes at points 30 and 33 at the periphery of the solar image position on the focal plane, are indicated, respectively, by 31'—32' and 34'—35'.

From the above it will be seen that, while that part of the main light beam going over the main path indicated by arrows e and g is entirely devoid of light waves forming the solar image after passing the intercepting device 23, the solar image is present in a weak form at the focal plane by virtue of the low intensity auxiliary light beam coming over the path indicated by arrows f and k so that the ultimate image formed at the focal plane is complete in all respects.

In the apparatus and method described, the relative intensity of the solar image at the focal plane as compared to the balance of the field of view represented on the focal plane will be variable by varying the relative efficiency of the partial reflecting surfaces 10 and 12. Therefore, an evenly illuminated entire field of view represented at the focal plane can be made by combining the low intensity solar image with the regulated surrounding image.

In Fig. 2 the reflecting surfaces 11 and 13 have been shown, for the purpose of convenience, as being formed by single right angle prisms, but the use of such devices would, of course, produce inverted images, and hence, in practice, it is considered preferable to replace the two prisms 15 and 16 with suitable image erecting prisms such, for example, as the roof angled prism indicated by 36 in Fig. 4.

Thus far the light intercepting device 23 has been described, for the purpose of simple illustration of a principle, as being in the nature of a light absorbing disc or inclined mirror, but such a simple device has certain inherent objections among which is heating and resultant convection current. The inclined mirror could conceivably be made to work and could be made to cut out the solar image completely, but this device would deform the area of partial illumination around the solar image in such a way that one of the points on the outer periphery of the zone of partial illumination (indicated by points 24—27 on Fig. 2) would be closer to the solar image than the other point on the opposite side. In other words, the outer limit of the zone of partial illumination would not have a center coinciding with the center of the solar image.

I therefore prefer to employ, for the purpose of intercepting solar image rays, an apparatus such as shown in Fig. 3. This apparatus shown in Fig. 3 comprises a light converging device which may be a lens, as indicated by numeral 37, and a suitable reflector 38. The converging device 37 may be of a diameter equal to and be positioned like the device 23 of Figs. 1 and 2 and will be so shaped as to converge the light rays striking thereon, as is indicated by lines 39 and 40. The reflector 38 is placed completely within the area of totally intercepted rays and is so disposed in the path of the converging light beam, in this case indicated by lines 39 and 40, as to reflect this converging beam at an angle to the axis of the main beam and effectively remove it from the image at the focal plane. The light intercepted by the reflector 38 will be totally reflected and will represent lost light. By reference to Fig. 3, whereon certain of the lines indicating cones of light in Fig. 2 are also represented and indicated by like characters, it will be seen that the reflector 38 is located wholly within the area of rays totally intercepted by the converging device 37.

In the use of the device of the kind described it will usually be desirable to move the image intercepting device 23, or its equivalent, laterally of the axis of the light beam forming the total image so as to keep it in correct position to intercept just the solar image-forming waves, and since it is hard to arrive at absolute accuracy of adjustment, it may be desirable to make the diameter of the destroying device just slightly greater than that of the solar image forming part of the main light beam at the point of interception. This, of course, would leave a very narrow annular dead area, as far as the main beam illumination is concerned, on the focal plane just surrounding the solar image position, but a very narrow annular dead area of this kind would not be objectionable for the great majority of uses.

The form of the invention shown in Fig. 5 has the advantage over that of Figs. 1 and 2 of being simpler in construction and is theoretically capable of accomplishing very similar results. In fact, for some uses, such as in short focal length telescopes, this simplified construction of Fig. 5 may provide a satisfactory substitute for that of Figs. 1 and 2, but in long focal length optical devices, such as range finding telescopes, the problem arising from heat and resultant convection currents, which are not a factor in the device of Figs. 1 and 2 when the intercepting device illustrated in principle by Fig. 3 is incorporated therein, may render the use of the device of Fig. 5 objectionable.

In Fig. 5 the sun is indicated by 6', the total field of view of the objective lens by circle 7', and the varying light intensity radially outwardly of the sun to the periphery of the field of view by radial lines 8'. The simplified apparatus of Fig. 5 comprises an objective lens 9' which may be assumed to correspond to the objective lens 9 of Figs 1 and 2, and an intercepting device 23' which may be assumed to correspond in character and function to the intercepting device 23 of Figs. 1 and 2. Preferably this intercepting device 23' will be in the nature of a light filtering and/or absorbing device such as a colored filter of great opacity or a light polarizing device capable of very high light absorbing efficiency, or a partially silvered mirror of sufficiently low light transmitting character. A superimposed and crossed series of "Polaroid" screens produced by the Polaroid Corporation of Boston, Massachusetts, or thin plates of tourmaline crystal of circular form might conceivably be used for this purpose.

The focal plane of the objective lens 9' is indicated by dotted line f'—f', and a cone of light forming a point 24' at one extreme outer edge of the total field represented on the focal plane is indicated by lines 41 and 42, and a similar cone of light forming a point 27' at the opposite extreme outer edge of the field of view represented on the focal plane is indicated by lines 43 and 44. Also on Fig. 5 a cone of light forming a point 30' at one point at the periphery of the solar image position on the focal plane is indicated by lines 45 and 46 and a similar cone of light forming a point at the opposite edge of the solar image position on the focal plane is indicated by lines 47 and 48.

As is clear, by reference to Fig. 5, the light energy reaching the focal plane from the objective lens reaches the same only over one path and the intercepting device 23' is located in the same relatively spaced relation to the focal plane as is the case of Figs. 1 and 2, so that it intercepts all the light energy which would form the solar image on the focal plane and, of course, intercepts also some of the light energy, but to a variable extent decreasing radially outwardly of the solar image, that will form the image of the field surrounding the solar image. For the purpose of example and disregarding any objectionable irregular transmission of light, it may be assumed that the intercepting device absorbs, filters out, or otherwise removes all but one millionth part of the total light energy striking the same and passes the remaining one millionth to form the solar image on the focal plane. At any rate, the transmitting efficiency of the device may be varied so as to determine the relative brilliance of the solar image on the focal plane and the variable spacing thereof from the focal plane will determine the radius of the annular area of variable light intensity reduction effected over the field surrounding the solar image. In theory at least this device will accomplish all that is accomplished by the form of the invention disclosed in Figs. 1 and 2 in that the principle involved can be utilized to render a field of view including the solar image and surrounding space of substantially uniform light intensity over the focal plane but, as previously pointed out, this form of the invention is subject to an inherent disadvantage, i. e., heating of the device 23 and resultant convection currents causing impairment of the resultant image and scattering of light because of irregular transmission.

The device or scheme of Figs. 1 and 2 can be rendered devoid of these faults merely by using an intercepting device such as shown in Fig. 3 which, unfortunately, does not lend itself to use in connection with the scheme of Fig. 5 which depends on partial transmission of light through the intercepting device. However, the scheme shown in Fig. 5 is cheaper to utilize and will undoubtedly find practical but somewhat limited application.

Obviously, the apparatus of either form of the invention shown in Figs. 1 and 2 or Fig. 5 can be duplicated to provide a binocular instrument or could be duplicated for use in connection with the various types of range finders now in use.

While the high intensity light beam and the auxiliary low intensity light beam, which are combined in the present arrangement to provide a composite image, are herein illustrated and are preferably formed by reflecting part of the light energy out of the beam projected from a single objective lens, it will be seen that these two beams could be formed by separate but closely spaced lenses of different apertures. However, this scheme would not be expected to provide as satisfactory results or to produce as good over-all results as would the arrangements disclosed particularly in Figs. 1, 2 and 3 since the axis of the view of the two lenses would be neither concentric or parallel.

What I claim is:

1. An optical apparatus for inspecting a field of view which includes the sun and a surrounding field, said apparatus comprising an objective lens, means for viewing the image formed at the focal plane of the objective lens, a light divider arranged adjacent said lens and being of a character to transmit a major portion of the light rays projected from said lens and to reflect a minor portion, a light ray intercepting device disposed in the path of said transmitted light rays and being of a size and shape to intercept only a portion of said rays, and reflecting devices positioned to direct the minor reflected rays of light beyond the intercepting device and concentrically with said transmitted light rays so as to replace the intercepted rays from the sun in the provision of an image of substantially uniform light intensity.

2. The structure defined in claim 1 in which the said light ray intercepting device comprises crossed polarizing means.

3. The structure defined in claim 1 in which the said light ray intercepting device comprises a light ray converging lens located intermediate the objective lens and the focal plane thereof and having a diameter as specified in claim 1 and having a focal length less than the distance between the intercepting lens and the focal plane of the objective lens, and a reflecting surface disposed across the converging beam of light from the intercepting lens and of a diameter and shape such that it will intercept the total projected beam from the intercepting lens and reflect the same out of the view of the eye piece, the maximum diameter of the reflecting surface being less than that of the cone of light intercepted by the intercepting lens at its distance from the focal plane.

4. In an optical apparatus for inspecting a field of view which includes the sun and a surrounding field, an objective lens having an angle of view sufficient to take in the sun and a surrounding field and projecting a composite beam of light rays, a partial reflecting surface diagonally disposed across the entire cross section of the projected beam, said reflecting surface being disposed across the entire portion of the objective lens beam visible through the viewer at the focal plane and being of such character and construction that it will intercept and reflect out of the main beam only a very small percentage of the total light energy in whose path it is located to provide a low intensity auxiliary beam of projection and a high intensity main beam of projection, an optical eye piece focused on the focal plane of the main projected beam, a light intercepting device located intermediate the said partial reflecting surface and the focal plane of the main beam and positioned to interrupt a circular portion of the light beam forming the focal plane image visible through the eye piece, said light ray intercepting device being of materially less diameter than the total diameter of the total image forming beam at the point of interception thereby but large enough to completely intercept the solar image forming portion of the light beam at such point, and other reflecting surfaces positioned in the path of the low intensity auxiliary light beam and arranged to direct the same concentric with the main light beam at a point after the said intercepting device so that the main and auxiliary beams will form a composite image at a common focal plane.

5. In an optical apparatus for inspecting a field of view which includes the sun and the surrounding field, optical structure including a light divider of a character to transmit a major portion of the light rays from said field and to reflect a minor portion of said rays, means for viewing the image formed at the focal plane of the transmitted light beams, an intercepting device positioned to intercept only the portion of the transmitted light rays which include the rays from the sun, and reflecting surfaces positioned in the path of the reflected light rays and arranged to direct the same concentrically with the transmitted light rays at a point beyond the said intercepting device and with the portion of the reflected light rays replacing the intercepted portion of the transmitted light rays from the sun in the provision of an image of substantially uniform light intensity.

6. The structure defined in claim 5 wherein said intercepting device includes a light ray converging lens, and a reflector disposed within the area of reflected rays and operative to deflect the rays wholly out of the view of the image viewing means.

MERRILL R. HOLSTE.